Figure 1:
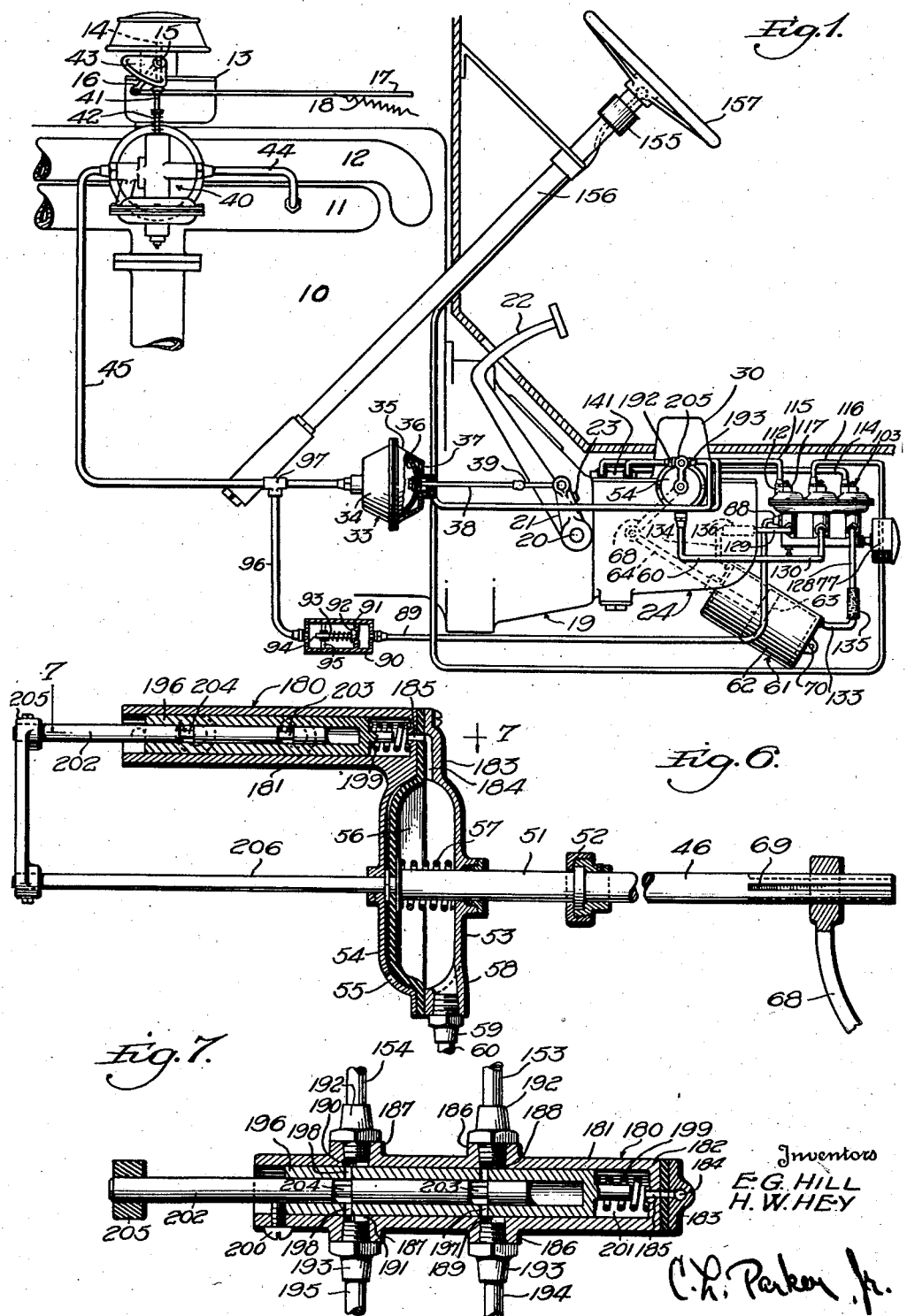

Feb. 11, 1936.  E. G. HILL ET AL  2,030,838
GEAR SHIFTING MECHANISM FOR MOTOR VEHICLES
Filed April 11, 1935  3 Sheets-Sheet 2

Inventors
E. G. HILL
H. W. HEY

By C. L. Parker Jr.
Attorney

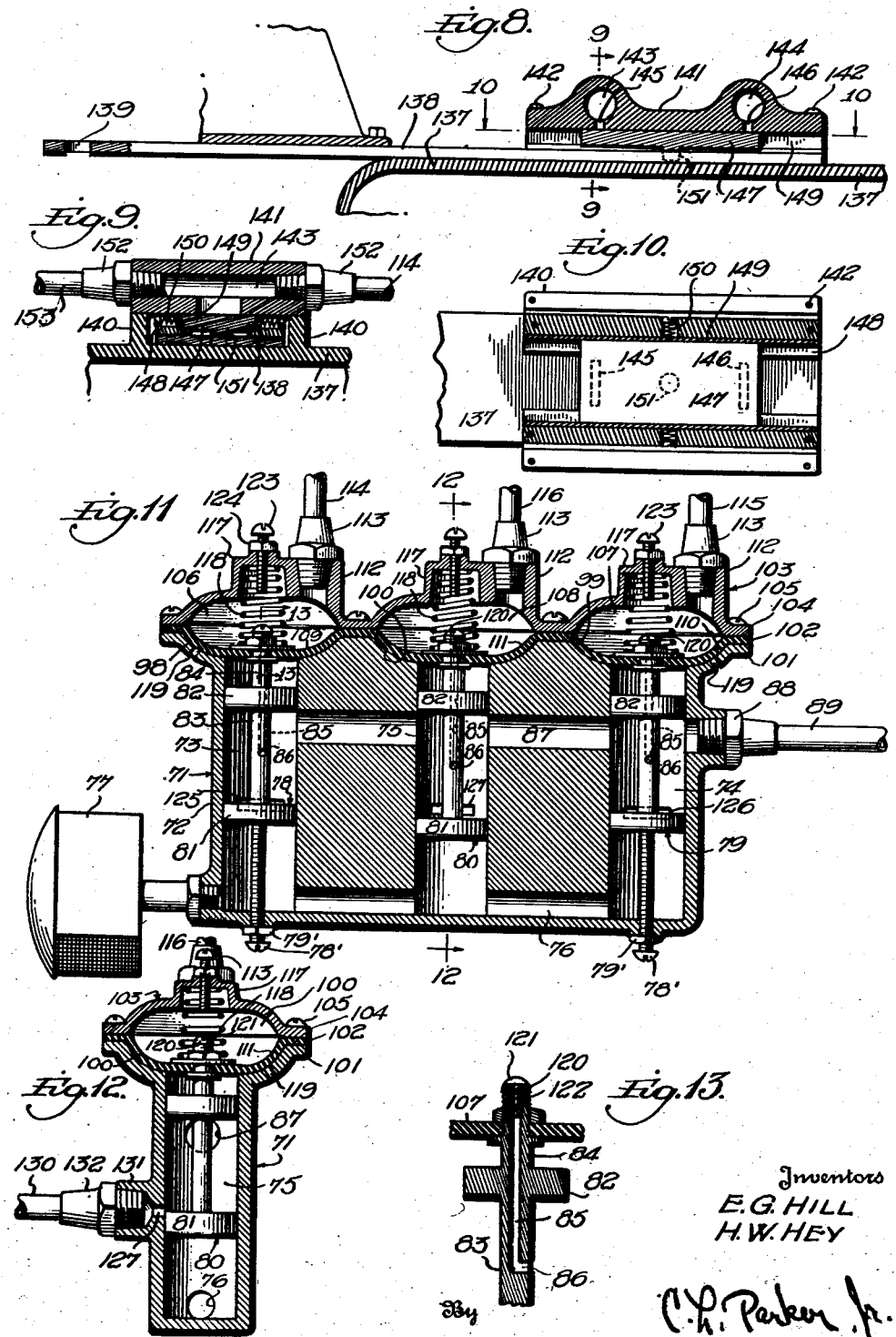
Feb. 11, 1936.  E. G. HILL ET AL  2,030,838
GEAR SHIFTING MECHANISM FOR MOTOR VEHICLES
Filed April 11, 1935    3 Sheets-Sheet 3
Inventors
E. G. HILL
H. W. HEY Patented Feb. 11, 1936

2,030,838

UNITED STATES PATENT OFFICE 2,030,838

GEAR SHIFTING MECHANISM FOR MOTOR VEHICLES

Edward G. Hill and Henry W. Hey, Richmond, Va., assignors to Automatic Shifters, Inc., Richmond, Va., a corporation of Virginia Application April 11, 1935, Serial No. 15,904

42 Claims. (Cl. 74—334)

This invention relates to gear shifting mechanisms for motor vehicles.

A number of devices have been proposed for providing power means for shifting the gears of a motor vehicle under the control of the operator, without the necessity of moving the gear shift lever, and such devices employ various power means for effecting the shifting action, such as solenoids, differential pressure devices, etc. A number of serious problems are involved in properly controlling the gear shifting action. For example, it is desirable to provide some means for preventing the gears from being shifted, except when the clutch is disengaged, and it is highly desirable to provide control means which will operate to place the gear shifting mechanism in neutral position.

In certain prior constructions referred to, gear shifting mechanisms have been provided which are operable by differential pressure and which act in combination with a power operated clutch control mechanism in such a manner that the shifting of the gears is dependent upon the prior releasing of the clutch elements. Thus such mechanism provides the safety feature of preventing the shifting of the gears except when the clutch is disengaged and provides the advantage of preselection in that it permits the control mechanism for the shifting device to be placed in given position prior to declutching, whereupon it is necessary merely to release the clutch in order to permit shifting to the selected gear.

Some of the prior constructions which have been proposed for shifting the gears of a motor vehicle are operable by differential pressure and the several control valves employed for the differential pressure devices are controlled by electrical switches connected in rather complicated circuits. For example, the selecting lever adjacent the steering wheel may be moved to a given position to close one switch, whereupon a second switch in the same circuit is closed when the clutch elements are released, thereby opening a valve to energize the power device and move the gears to the selected position. When the gears reach such position another switch is opened to break the previously closed circuit and thus render the mechanism ready for a subsequent operation. In view of the number of operations which must be performed by a device of this character it will be apparent that numerous electrical control circuits are involved, thus rendering the apparatus relatively expensive to manufacture and easily liable to derangement.

An important object of the present invention is to provide a simple form of gear shifting mechanism which is wholly under the control of the operator, whereby the gears may be stopped in neutral position at any time and allowed to remain in such position, thus eliminating the necessity for the operator having to manually move the gear shift lever to neutral position when the vehicle is stopped, or the necessity for having to hold the clutch pedal in depressed position when starting the motor.

A further object is to provide a mechanism of the character referred to wherein all necessary functions of the gear shifting mechanism are controlled by a small lever adjacent the steering wheel, thus permitting the gear shift lever to be wholly eliminated from the driving compartment of the vehicle.

A further object is to provide a mechanism of the character referred to which is wholly mechanical, thus completely eliminating the use of electrical control circuits and rendering the mechanism far more dependable in operation.

A further object is to provide a simple operating lever arranged adjacent the steering wheel and movable to control three simple types of valves which merely operate to connect their associated conduits to the atmosphere to actuate a control mechanism to determine the operation of the shifting mechanism.

A further object is to provide a mechanism of the character referred to wherein two of the valves adjacent the steering wheel are adapted to be selectively opened to determine the direction of movement of the gear shifter forwardly and rearwardly with respect to the vehicle, and wherein the third valve is operable for determining the lateral position of the gear shifting element.

A further object is to provide novel means for controlling the main valve mechanism to stop the gear shifting element in neutral position when the controlling lever is moved to a corresponding position.

A further object is to provide novel means for governing the rate of gear shifting to prevent such operation from taking place too rapidly.

A further object is to provide a gear shifting mechanism including a differential pressure motor having a movable element therein which is vacuum suspended in each of its two limits of movement to permit immediate operation upon the connection of one end of the motor to the atmosphere, and wherein both ends of the motor are open to the atmosphere when the movable member of the motor is in its central position and the gears are in neutral position, to thus permit the gears to remain in such position indefinitely.

A further object of the invention is to provide a gear shifting mechanism which operates to move the shifting element relatively rapidly out of either of its positions, but wherein the movement of the shifting element into each of its positions is retarded.

Other objects and advantages of the invention will become apparent during the course of the following description.

In the drawings we have shown one embodiment of the invention. In this showing—

Figure 2:
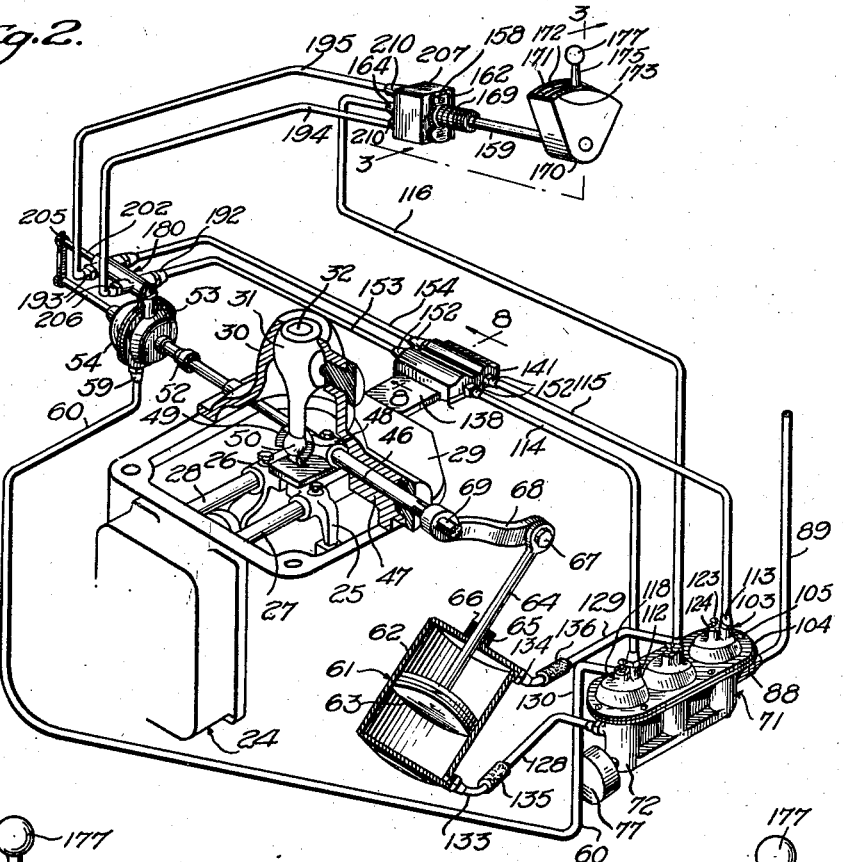
Figure 4:
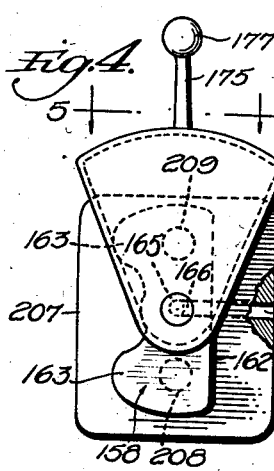
Figure 3:
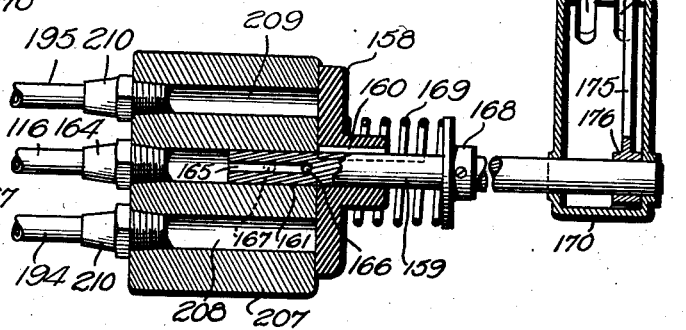
Figure 5:
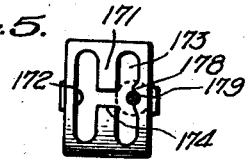

Figure 1 is a side elevation of a portion of a motor vehicle power plant, showing the invention applied, Figure 2 is a fragmentary perspective view of a portion of a motor vehicle gear set showing the operating and controlling means therefor together with the piping connections, Figure 3 is a sectional view taken substantially on a plane indicated by the line 3—3 in Figure 2, Figure 4 is an end elevation of the control lever and associated elements, Figure 5 is a detail sectional view on line 5—5 of Figure 4, Figure 6 is a transverse sectional view showing the gear shift operating rock shaft and associated elements, Figure 7 is a horizontal sectional view on line 7—7 of Figure 6, Figure 8 is a vertical sectional view through the gear set operated valve, taken substantially on line 8—8 of Figure 2, Figure 9 is a detail transverse sectional view on line 9—9 of Figure 8, Figure 10 is a horizontal sectional view on line 10—10 of Figure 8, Figure 11 is a central vertical longitudinal sectional view through the main control valve mechanism, Figure 12 is a transverse vertical sectional view on line 12—12 of Figure 11, and, Figure 13 is an enlarged detail sectional view on line 13—13 of Figure 11.

Referring to Figure 1, the numeral 10 designates a motor vehicle engine having the usual intake manifold 11 and exhaust manifold 12. The intake manifold is provided with the usual carbureter 13 having a butterfly control valve 14 mounted on a shaft 15 operable by an arm 16. Suitable accelerator means is provided for operating the throttle arm 16. Such means includes a rod 17 provided with a return spring 18, and connected in any suitable manner to a conventional accelerator pedal (not shown).

The engine is provided with the usual clutch indicated as a whole by the numeral 19 and including the usual clutch plates (not shown) operable by a rock shaft 20. This shaft is provided with an arm 21 secured thereto, as shown in Figure 1. A clutch pedal 22 has its lower end freely mounted on the shaft 20 and provided with a lug 23 engageable with the arm 21 to actuate the latter upon depression of the clutch pedal.

A gear set 24 is mounted rearwardly of the clutch and may be provided with conventional gears (not shown) shiftable by means of the usual forks 25 and 26 secured to the usual shift rods 27 and 28 respectively. The gear set in Figure 2 is shown looking angularly toward the forward end of the vehicle, and accordingly the shift rod 27 controls first and reverse gears while the shift rod 28 controls second and high gears. The casing of the transmission is provided with the usual cover 29 having an upwardly projecting portion 30 universally supporting a lever 31, corresponding to the lower portion of the usual conventional gear shift lever. It will be apparent that the upper portion of this lever is omitted, but the lever 31 may be provided with a socket 32 in its upper end for the reception of a rod when it is desired to operate the transmission conventionally. The lower end of the lever 31 engages the forks 25 and 26 in the usual manner to effect a change in forward driving ratio or to place the gear set in reverse gear.

It will become apparent that the gear shifting mechanism forming the subject matter of the present invention may be operated with a foot controlled clutch, but it is preferred that it be employed in connection with a power operated clutch control mechanism. Referring to Figure 1, the numeral 33 designates a differential pressure power device including casing sections 34 and 35 having a diaphragm 36 clamped therebetween, and the casing section 35 is vented to the atmosphere as at 37. A rod 38 is connected at its forward end to the diaphragm 36, and has its rear end connected by a cable or similar flexible element 39 to the upper end of the clutch arm 21.

Any suitable form of valve mechanism may be employed for controlling the power device 33, but it is preferred that the valve mechanism described and claimed in the patent to Edward G. Hill, No. 1,964,693, granted June 26, 1934, be employed. It will become apparent that the gear shifting mechanism to be described is not in any sense dependent for its operation on the particular type of control valve mechanism for the power device 33, since any control valve mechanism operative for actuating and deactuating the power device 33 may be employed. The valve mechanism is indicated as a whole by the numeral 40 and is indicated in Figure 1 as being operable by a stem 41 normally urged upwardly by a spring 42 and movable downwardly by a cam 43 secured to the throttle shaft 15.

The valve mechanism 40 is provided with a conduit 44 leading to the intake manifold 11, and is provided with a second conduit 45 leading to the casing section 34. When the valve mechanism and its operating elements are in the position shown in Figure 1, the throttle is partially opened and the power device 33 is deenergized, whereby the clutch elements are in operative engagement. Upon the closing of the throttle 14, the stem 41 is depressed by the cam 43 to connect the casing section 34 to the intake manifold through conduits 44 and 45.

Motion is transmitted to the shifting lever 31 by means of a shaft 46. This shaft extends transversely of the gear set and is journaled in bearings 47 carried thereby. An arm 48 is carried by the shaft 46 and terminates in a yoke 49 engaging a ball 50 formed in the lever 31. The shaft 46 is adapted to rock in its bearings, whereby the yoke 49 transmits forward and rearward movement to the lower end of the lever 31 to effect the shifting of the gears, as will be apparent. The shaft 46 is adapted to slide in its bearings to determine the lateral position of the lower end of the lever 31, in the same manner that such lateral movement is effected by a conventional transmission lever in selecting the proper gears.

The means for effecting lateral movement of the lower end of the lever 31 by sliding the shaft 46 in its bearings is shown in detail in Figure 6 of the drawings. At the left hand end of the shaft 46 a relatively short shaft 51 is arranged in axial alinement therewith and is connected thereto by a suitable swivel 52. This swivel is provided to permit the rocking of the shaft 46 without transmitting similar movement to the shaft 51. The shaft 51 extends into one of a pair of casing sections 53 and 54, the latter of which is open to the atmosphere through a port 55. A diaphragm 56 is clamped between the edges of the casing sections 53 and 54 and is secured to the adjacent end of the shaft 51. A spring 57 engages the diaphragm 56 to urge it toward the left as viewed in Figures 2 and 6, thus biasing the shift lever 31 toward the second and high gear side of the gear set. The casing section 53 is provided with an extension 58 in which is tapped a union 59 connected to a pipe or conduit 60. Means to be described is provided for connecting the casing section 53 to a source of vacuum through the pipe 60 to overcome the tension of the spring 57 and thus slide the shaft 46 and move the lever 31 to the reverse and low gear side of the gear set.

Referring to Figures 1 and 2 the numeral 61 designates a power device operative for rocking the shaft 46. In the present instance the power device is illustrated as comprising a cylinder 62 in which a piston 63 is reciprocable. A piston rod 64 is connected at one end to the piston 63 and extends through the adjacent end of the cylinder through a suitable bearing 65 preferably provided with a packing gland 66. The other end of the rod 64 is pivotally connected as at 67 to one end of an arm 68, and the other end of this arm is splined as at 69 to the adjacent end of the shaft 46. Accordingly rocking of the arm 68 is adapted to rock the shaft 46, and at the same time this shaft is slidable through the arm 68 by virtue of the splined connection 69. Obviously the rocking of the arm 68 must be compensated for by movement of the cylinder 62, and for this purpose the cylinder is provided with pivot means 70 supported with respect to any suitable portion of the vehicle.

Main control valve mechanism indicated as a whole by the numeral 71 is provided for controlling the operation of the piston 63 and for controlling the connection of the casing section 53 to the atmosphere or to a source of suction, such as the intake manifold 11. The main control valve mechanism is illustrated in detail in Figures 11, 12 and 13. This mechanism comprises a preferably cast body 72 having two relatively large vertical openings 73 and 74 extending downwardly thereinto adjacent the ends of the casing, and a similar vertical opening 75 is provided substantially centrally of the length of the casing. Each of these vertical openings communicates at its lower end with a longitudinal passage 76 communicating with the atmosphere through any suitable type of air cleaner 77 to minimize the entrance of dust or other foreign material into the valve casing.

The vertical openings 73, 74 and 75 are provided with valves respectively indicated as a whole by the numerals 78, 79 and 80. These valves are identical with each other and only one need be described in detail. Referring to Figure 11, it will be noted that each of the valves referred to comprises a lower cylindrical head 81 and an upper similar head 82, and these heads are connected by a stem 83. This stem extends above the head 82 as indicated by the numeral 84 for a purpose to be described. Each stem 83 is provided with a longitudinal passage 85 (see Figure 13) extending from the upper extremity of the stem portion 84 to a point between the two heads 81 and 82 and communicates with a lateral port 86 communicating with the interior of the vertical opening in which the valve is arranged. A longitudinal passage 87 extends horizontally through the casing 72 and affords communication between the openings 73, 74 and 75, and at one end of the valve casing a union 88 is tapped into the passage 87 and is connected to one end of a pipe or conduit 89.

The pipe 89 is connected to one end of a casing 90 divided by a partition 91 having an opening in the center thereof normally closed by a valve 92 urged toward its seat by a spring 93. The spring surrounds the stem 94 of the valve, which operates in a suitable guide 95. The other end of the casing 90 is connected to one end of a pipe 96, and the other end of this pipe is connected by a T 97 to the pipe 45. It will be apparent that the presence of a partial vacuum in the conduit 89 is dependent upon the building up in the power device 33 of a sufficient differential pressure to unseat the valve 92 against the tension of the spring 93, and the tension of this spring is such as to prevent the valve 92 from opening until the differential pressure of the power device 33 is sufficient to disengage the clutch. Accordingly it will become apparent that the shifting of the gears is always dependent upon the prior releasing of the clutch elements.

The valve casing 71 is provided in its upper end with circular pockets or recesses 98, 99 and 100 arranged coaxially with respect to the valves 78, 79 and 80, respectively. To provide for the pockets referred to the top of the valve casing 72 is outwardly flanged as at 101. A flexible sheet 102 is arranged over the flange 101 and corresponds in shape and size thereto. A cap indicated as a whole by the numeral 103 is arranged over the flexible sheet 102 and has an outer flange 104 corresponding in shape and size to the flexible sheet 102. Screws 105 secure the cap to the valve casing, and these screws pass through the flanges 101 and 104 to clamp the sheet 102 therebetween.

The cap 103 is provided with circular recesses 106, 107 and 108, corresponding in position to the recesses 98, 99 and 100. The sheet 102 therefore forms three diaphragms 109, 110 and 111 movable in the pairs of recesses referred to. These three diaphragms are secured to the valve stems 84 of the respective valves 78, 79 and 80. The pockets 106, 107 and 108 form chambers each of which communicates with the interior of a boss 112 formed integral with the cap 103, and a union 113 is tapped into each boss 112. Pipes 114, 115 and 116 are connected to the unions 113 to communicate with the respective chambers 106, 107 and 108, and these pipes are adapted to be connected to the atmosphere in a manner to be described.

Each chamber 106, 107 and 108 is provided with an axial extension 117 in which is arranged the upper end of a spring 118, the lower end of each of these springs engaging its respective diaphragm to urge the latter downwardly. The passages 85 and 86 normally function to afford limited communication between the vacuum passage 87 and the chambers 106, 107 and 108, and under such conditions, differential pressure is established on opposite sides of the diaphragms 109, 110 and 111 by means of bleed ports 119 communicating between the atmosphere and the vertical openings 73, 74 and 75, above the valve heads 82.

It is necessary, as will become apparent, that communication between the vacuum passage 87 and the respective chambers 106, 107 and 108 be restricted and that upward movement of the valves 78, 79 and 80 be limited. Referring to Figure 13, it will be noted that the upper end of each valve passage 85 is provided with a screw 120 having the usual screw driver slot 121 in its upper end and provided with a restricted axial passage 122. This passage acts to restrict communication through the passage 85 of each valve, and each screw 120 obviously is replaceable by a screw having an axial passage of different size, depending upon the size found to be desirable. This screw also acts to engage the lower end of a screw 123 threaded in each axial extension 117, and each screw 123 is provided with a lock nut 124 to secure it in adjusted positions. Thus it will be apparent that the screws 123 are adapted to limit the upward movement of the valves 78, 79 and 80.

The cylindrical openings 73, 74 and 75 are provided with ports 125, 126 and 127 respectively, as shown in Figure 11, and these ports are connected respectively to pipes 128, 129 and 130. The means for connecting these pipes to their ports may be of the type illustrated in Figure 12, the valve casing 71 being provided with internally threaded bosses 131 having unions 132 tapped thereinto for connection with the pipes referred to.

As is generally well known, it is preferred that the movement of the shifting mechanism into either of its four positions should take place relatively slowly, although movement of the lever 31 out of any of its positions may take place as rapidly as desired. The present apparatus contemplates such a mode of operation, and for the purpose of somewhat retarding the shifting movement at the proper time, the effective area of the ports 125 and 126 is preferably limited when the valves 78 and 79 move to their lower positions. This may be accomplished by providing the bottom of the valve casing 72 with set screws 78' adapted to be locked in selected positions by lock nuts 79'. It will be apparent that when the valves 78 and 79 move upwardly, their respective ports 125 and 126 are wholly uncovered, but when these valves move downwardly, the ports 125 and 126 are only partially uncovered, and this operation of the valves 78 and 79 is taken advantage of for limiting the speed of the shifting movement as the shift lever 31 moves into either of its four positions.

Referring to Figure 2 it will be noted that the cylinder 62 is provided adjacent its ends with pipe connections 133 and 134, connected to the respective pipes 128 and 129 by flexible tubes 135 and 136, the obvious purpose of these tubes being to permit swinging movement of the cylinder upon rocking movement of the arm 68.

Referring to Figures 2 and 8, the numeral 137 designates the top portion of the transmission housing adjacent the clutch, and this portion of the housing supports a horizontal slide 138 extending into the transmission housing and provided with an opening 139 through which the lever 31 projects, just below the ball 40. It will be apparent that the opening 139 is of such a length transversely of the slide 138 as to permit lateral movement of the lower end of the shift lever 31 to selectively engage the forks 25 and 26 without transmitting any lateral movement to the slide 138. It will be apparent that this slide is movable longitudinally however, when the lower end of the shift lever 31 moves forwardly and rearwardly.

The top plate 137 is provided with upstanding flanges 140, and a valve cap 141 is secured against the upper edges of these flanges by screws 142. The cap 141 is provided with a pair of transverse passages 143 and 144 extending therethrough, and these passages are provided with downwardly opening ports 145 and 146, as clearly shown in Figure 8. These ports are shown in broken lines in Figure 10 to indicate their relative positions with respect to a slide valve 147 which governs the opening and closing of the ports. The valve 147 is slidable in guides 148 secured against the bottom of the cap 141 as shown in Figure 9. It will be apparent that the valve 147 is somewhat longer than the distance between the remote edges of the ports 145 and 146. The edges of the valve 147 are tapered as shown in Figure 9, and these tapered edges are engaged by bearing strips 149 urged inwardly by small springs 150, this action tending to urge the valve upwardly and maintain it against the lower face of the cap 141, which constitutes the seat for the valve 147. This valve is provided substantially centrally thereof with a depending lug 151 engageable in a similarly shaped opening formed in the slide 138. It will be apparent that longitudinal movement of the slide is adapted to transmit similar movement to the valve 147.

It will become apparent that the valve 147 is operative for stopping the shift lever 31 in neutral position, and it is also operative when the motor piston 63 reaches each end of its stroke for stopping the piston and preparing it for movement in the other direction. This action is accomplished by controlling the exhausting of air from the diaphragm chambers 106 and 107. Each end of each of the passages 143 and 144 is provided with a union 152 tapped thereinto. The unions 152 at one side of the cap 141 are connected respectively to the pipes 114 and 115, and these pipes, as previously described, communicate respectively with the chambers 106 and 107, as shown in Figure 11. The unions 152 at the opposite side of the cap 141 are connected respectively to pipes 153 and 154.

A supplemental valve mechanism indicated as a whole by the numeral 180 is operative for permitting preselection of the gear set under conditions in which preselection otherwise would not be possible, as explained in detail later. Referring to Figures 6 and 7, it will be noted that the valve mechanism 180 comprises a valve cylinder 181 which is preferably cast integral with the diaphragm casing 54. The cylinder 181 has one end closed as at 182, and the latter end of the cylinder overhangs and fits against an extension 183 formed on the diaphragm casing 53. This extension is provided with a port 184 communicating at one end with the interior of the chamber 53 and at its opposite end with a port 185 leading into the adjacent end of the cylinder 181.

The valve cylinder 181 is provided with pairs of oppositely arranged bosses 186 and 187, as shown in Figure 7. The bosses 186 are provided with ports 188 and 189 respectively, while the bosses 187 are respectively provided with ports 190 and 191. The ports 188 and 190 are provided with unions 192 connecting these ports with the respective pipes 153 and 154. Unions 193 are tapped into the ports 189 and 191 to connect these ports respectively to pipes 194 and 195 leading to a manually controlled valve mechanism to be described.

The end of the cylinder 181 opposite the closed end 182 is open, as shown in Figure 7. A cylindrical valve 196 is axially slidable in the cylinder 181 and is provided with a pair of ports 197 in constant registration with the respective ports 188 and 189. The valve 196 is further provided with a pair of oppositely arranged ports 198 in constant registration with the respective ports 190 and 191. The valve 196 is urged toward the left as viewed in Figure 7 by a spring 199, and movement of the valve in such direction is limited by a set screw 200. It will be apparent that atmospheric pressure is operable against the left hand end of the valve 196, as viewed in Figure 7, to move this valve toward the right when a partial vacuum exists in the chamber 201 formed between the cylindrical valve 196 and the head 182.

Communication across the ports of the valve 196 is controlled by a slide valve 202, reciprocable within the valve 196. The valve 202 is provided with an annular port 203 normally in registration with the ports 197, and the valve 202 is provided with a second annular port 204 normally communicating with the ports 198. The valve 202 projects beyond the end of the cylinder 181 and is provided with an arm 205 extending downwardly from the valve 202 as shown in Figure 6. The lower end of this arm is connected to a stem 206 secured to the end of the shaft 51 to move therewith when the shift lever 31 moves laterally with respect to the transmission.

A novel manually controlled valve mechanism is provided for controlling communication between the pipes 116, 194 and 195, and the atmosphere. This valve mechanism is preferably located adjacent the steering wheel of the vehicle and may be contained within a suitable housing 155 secured to the steering column 156 having the usual steering wheel 157 at its upper end. The housing 155 extends laterally from the steering post, as will become apparent, but it is not essential to the present invention that any particular type of housing be employed. Referring to Figures 2, 3 and 4, the numeral 207 designates a valve housing having a pair of passages 208 and 209 extending therethrough and connected to the respective pipes 194 and 195 by suitable unions 210.

A valve 158 seats against the end of the valve casing 207 remote from the connections of the pipes 194 and 195, as shown in Figure 3. This valve is splined on a shaft 159, as at 160, and the shaft 159 extends into an opening 161 arranged parallel to the openings 208 and 209. The valve 158 has a straight edge 162, and when the valve is in the vertical position shown in Figure 4, both passages 208 and 209 are closed. The valve is adapted to be rocked in a counter-clockwise direction as viewed in Figure 4 to uncover the port 209 and in a clockwise direction to uncover the port 208. The valve has circumferentially elongated portions 163 each of which functions to maintain one of the passages closed while the other is opened upon rotation of the shaft 159. One end of the opening 161 constitutes a passage to which the pipe 116 is connected by a union 164. The shaft 159 is provided in its inner end with an axial passage 165 terminating in a transverse opening 166. The valve housing 207 is provided with a transverse opening 167, communicating with the atmosphere as shown in Figure 4. As previously stated, the shaft 159 is splined to the valve 158, and the shaft is axially slidable in the opening 161, under conditions to be described, to bring the port 166 into registration with the passage 167. This action, therefore, connects the pipe 116 to the atmosphere.

A collar 168 is secured to the shaft 159 at a point spaced from the valve 158 and a light coil spring 169 has one end seating against the collar 168 and its opposite end against the valve 158 to maintain the latter on its seat regardless of the longitudinal position of the shaft 159 with respect to the valve 158. The shaft 159 extends into the lower portion of a segmental housing 170 having an arcuate upper face 171. The arcuate face 171 is provided with relatively long parallel slots 172 and 173 connected centrally of their length by a transverse slot 174. A small lever 175 has a collar 176 at its lower end secured to the shaft 159 and an operating handle, preferably in the form of a ball 177, is arranged on the upper end of the lever 175. The collar 176 is engageable against the wall of the casing 170 remote from the collar 168, to limit the movement of the shaft 159 toward the right as viewed in Figure 3.

When the collar 176 is in the position described, the lever 175 substantially contacts with the outer edge of the slot 173, and opposite the transverse slot 174, the slot 173 is preferably provided with slightly extended portions 178 forming a small notch 179 therebetween to assist the operator in locating the neutral position of the lever 175, as will become apparent. The parts of the device shown in Figure 3 are in a position corresponding to the position in which the driver of a vehicle would view them. The lever 175 partakes of movement corresponding to the conventional movements of a standard gear shift lever, and when the lever 175 is in the slot 173, the lever may be moved forwardly to place the gear set in second gear and rearwardly to place it in high gear. Obviously the spring 169 biases the lever 175 toward the second and high gear side of the segmental casing 170.

The operation of the apparatus is as follows:

So far as the operation of the gear shift mechanism is concerned, it may be considered that the clutch operating mechanism operates in accordance with any of the known types of clutch control mechanisms, such, for example, as the mechanism disclosed in the prior patent to Edward G. Hill, No. 1,964,693, referred to above. When the throttle 14 is at least partially opened, the high point of the cam 43 will be moved away from the upper end of the stem 41, and upward movement of this stem disconnects the pipe 45 from the vacuum pipe 44 and connects the pipe 45 to the atmosphere. Under such conditions the car may be operated in the usual manner and the clutch elements will be in operative engagement. When the throttle is moved to closed position, the high point of the cam 43 depresses the stem 41 and under such conditions the pipe 45 will be disconnected from the atmosphere and connected to the pipe 44. Thus it will be apparent that the power device 33 will be connected to the intake manifold and will be energized by differential pressure to effect clutch disengagement. Upon the building up in the power device of sufficient differential pressure to disengage the clutch, the valve 92 will be unseated to connect the passage 87 of the valve mechanism 71 to the intake manifold.

Thus it will be apparent that the operation of the motor 61 is dependent upon the previous disengagement of the clutch by the power device 33, regardless of the operation of the control valves which govern the operation of the motor 61. In other words, when the vehicle is in normal operation with the clutch engaged, no differential pressure can be built up in the motor 61 to affect the positions of the gears, and the handle 177 may be moved back and forth between any of its positions without causing any gear shifting operation to take place. This is important not only as a matter of safety, but it will become apparent that preselection of gears is provided without awaiting the disengagement of the clutch.

It also will be apparent that any type of valve mechanism 40 may be employed for the clutch operating power device 33, it merely being desirable so far as the present invention is concerned, for the pipe 89 to be connected between the power device 33 and whatever form of valve mechanism 40 is employed, for the reason stated.

It will become apparent that the present apparatus permits the motor to be stopped with the gears in neutral position, thus permitting the vehicle motor to be started at any time without depressing the clutch pedal. Assuming that the motor has been started with the gears in neutral position and with the throttle in idling position, it will be apparent that the clutch will be disengaged, and for reasons previously described, the passage 87 will be subjected to the partial vacuum present in the intake manifold through pipes 89, 96, 45 and 44 and the valve mechanism 40. Assuming that the lever 175 is arranged in the small notch 179 intermediate the length of the slot 173, the shaft 159 will be in the position shown in Figure 3 and the air port 167 will be closed.

Under such conditions, the center diaphragm chamber 108 will be disconnected from the atmosphere, and since this chamber communicates with the vacuum passage 87 through the valve passage 85, differential pressure will be maintained on opposite sides of the diaphragm 111 to hold this member upwardly against the tension of the spring 118. Under such conditions the lower head of the valve 80 will be arranged above the port 127, thus opening this port to the atmosphere through the passage 76 and air cleaner 77. The pipe 60 is connected between the port 127 and the diaphragm casing 53 (see Figure 6) and the interior of the chamber 53 thus will be connected to the atmosphere whereby balanced pressures will exist on opposite sides of the diaphragm 56. Accordingly the spring 57 will hold the shaft 46 toward the left as viewed in Figures 2 and 6, and the lever 31 will be retained at the second and high gear side of the gear set. As will be described in detail later, the valve mechanism 180 under the conditions being considered will function to connect the pipe 153 to the pipe 194, and to connect the pipe 154 to the pipe 195. It may be considered, therefore, that there is an unimpeded connection between the pipes 153 and 194 and between the pipes 154 and 195.

Under the conditions being considered, that is, with the lever 175 arranged in the notch 179, both valve passages 208 and 209 (see Figures 3 and 4) will be closed to the atmosphere and a partial vacuum will exist in the chambers 106 and 107 since these chambers communicate with the passage 87 through their respective valve passages 85. The tension of the springs 118 in the chambers 106 and 107 will thus be overcome by differential pressure on opposite sides of the diaphragms 109 and 110, thus holding the valves 78 and 79 in their upper positions to connect the ports 125 and 126 to the atmosphere through passage 76. Since the ports 125 and 126 are connected to opposite ends of the cylinder 62, it will be apparent that the piston 63 will remain in its intermediate position, corresponding to the neutral position of the gears with atmospheric pressure present on opposite sides of the piston.

Assuming that the driver desires to place the gear set in second gear, under which conditions modern motor vehicles can be readily started in motion under most conditions, it merely is necessary for the operator to push the knob 177 forwardly in the slot 173 to the second gear position.

Referring to Figure 4, it will be apparent that this operation rotates the valve 158 in a clockwise direction, thus opening passage 208 and connecting the pipes 153 and 194 to the atmosphere. These pipes communicate through the gear set valve passage 143 with the pipe 114 leading to the diaphragm chamber 106, and accordingly this chamber will be opened to the atmosphere.

The spring 118 thus immediately moves the valve 78 to its lower position, as shown in Figure 11, thus disconnecting the port 125 from the atmosphere and connecting it to the passage 87, and since the port 125 communicates with the rear or lower end of the cylinder 62 through the pipe 128, it will be apparent that differential pressure will move the piston 63 downwardly and rearwardly. Downward movement of the valve 78 is limited by its associated screw 78' to only partially uncover the port 125 for a purpose to be described. It will be recalled that the valve 79 will still be in its upper position whereby the port 126, and consequently the forward end of the cylinder 62, will be connected to the atmosphere. The action referred to swings the arm 68 in a clockwise direction as viewed in Figure 2, thus causing the shift lever 31 to be operated to move the shift fork 25 rearwardly to place the gear set in second gear.

As the shift lever 31 moves rearwardly, movement is transmitted to the slide 138 (see Figure 8) thus correspondingly moving the valve 147. When the second gear position is reached, the valve 147 will uncover the port 146 thus opening the passage 144 to the atmosphere through the space beneath the cap 141 forwardly of the valve 147. The opening of the port 146 therefore connects the pipe 115, and consequently the diaphragm chamber 107, to the atmosphere thus establishing pressure equalization on opposite sides of the diaphragm 110. The associated spring 118 thereupon moves the valve 79 downwardly into engagement with the upper end of the screw 78', thus partially uncovering the port 126 to connect the vacuum passage 87 to the pipe 129. Air thus will be exhausted from the upper end of the cylinder 62 and the partial vacuum thus established will be equal to the partial vacuum already existing in the lower end of the cylinder 62, and thus the piston 63 will remain in the lower end of the cylinder 62, corresponding to the second gear position, since no differential pressure is present in the cylinder to tend to move the piston 63.

After the operator has operated the accelerator to bring the clutch into engagement and gain the proper vehicle momentum in second gear, the present apparatus will operate under the control of the operator to shift into high gear. It will be apparent that preselection of high gear may take place, it being possible for the operator to move the knob 177 to the rear end of the slot 173 while the vehicle is in high gear since the operation of the gear shifting apparatus is dependent upon the disengagement of the clutch.

Assuming that the knob 177 has been moved to the high gear position and the clutch is disengaged, the piston 63 will move upwardly and forwardly to effect the shift into high gear. The movement of the knob 177 referred to causes the valve 158 to close the port 208 and open the port 209 to the atmosphere. It will be recalled that when the shift lever 31 reached second gear position, the slide valve 147 uncovered the port 146 to connect the pipe 115 to the atmosphere. While the movement of the knob 177 to high gear position opens the port 209 to the atmosphere, this action obviously will not affect the diaphragm chamber 107 since this chamber had been previously connected to the atmosphere through the slide valve port 146.

However, the movement of the knob 177 to high gear position rotates the valve 158 to close the port 208, and thus the diaphragm chamber 106 will be closed to the atmosphere, it being obvious that the slide valve 147 will now be moved toward the left from the position shown in Figure 8 to maintain the port 145 closed. Under such conditions, air will be exhausted from the diaphragm chamber 106 through the passage 85 of the valve 78, and atmospheric pressure acting against the bottom of the diaphragm 109 will move the latter upwardly, thus similarly moving the valve 78 to completely open the port 125 to the atmosphere through the passage 76. This action, of course, closes the port 125 to the vacuum passage 87, and simultaneously opens the lower end of the cylinder 62 to the atmosphere. The upper end of the cylinder 62 will have been previously connected to the intake manifold when the gears reached second gear position, as previously explained, and accordingly atmospheric pressure will act on the lower end of the piston 63 to move it forwardly and upwardly, thus swinging the arm 68 in a counter-clockwise direction as viewed in Figure 2 and the shift fork 25 will be moved toward high gear position. It should be borne in mind that, whereas the movement of the gears to second gear position caused the slide valve 147 to uncover the port 146, opposite movement of the valve 147 will take place when the shift is made into high gear, the slide valve being moved forwardly to open the port 145 to the atmosphere.

From the foregoing it will be apparent that the connection between the two ends of the cylinder 62 to the source of partial vacuum takes place upon the upward movement of the respective diaphragms 109 and 110, and this action, in turn, takes place by closing the respective pipes 114 and 115 to the atmosphere, under which conditions air will be exhausted from the space above the diaphragms referred to, by means of the valve passages 85. This feature is of substantial importance from a practical standpoint, since it will be apparent that only two pipes, namely, the pipes 194 and 195, need extend to the valve housing 207 adjacent the steering wheel to control the piston 63. In other words, it is unnecessary to use two pipes for each end of the cylinder 62, one connected to the atmosphere and the other to the source of vacuum. Thus the installation and operation of the apparatus are greatly simplified. Moreover, it will be apparent that the vacuum suspension of the piston 63 in either of its end positions permits extremely rapid operation since it is merely necessary to admit atmospheric pressure into one end of the cylinder 62 to effect movement of the piston 63.

From the foregoing it will be apparent that the operator may shift between second and high gears merely by leaving the knob 177 in its biased position toward the right side of the segmental housing 170 and moving the knob 177 back and forth between second and high gear positions. One of the features of the present apparatus lies in the provision of novel means whereby the shift lever 31 may be moved to neutral position and permitted to remain indefinitely in neutral position. The placing of the gears in high gear position has been described in detail, and assuming that the driver now desires to stop the vehicle with the gears in neutral position, it merely is necessary for the operator to move the knob 177 to an intermediate position with the arm 175 arranged in the notch 179. Neutral position may be preselected while the vehicle engine is still operating to propel the vehicle, and when the accelerator is released to effect declutching, it will be apparent that the valves 92 (see Figure 1) will be unseated to connect the passage 87 of the main valve mechanism to the source of partial vacuum. Assuming that the knob 177 is moved to neutral position it will be apparent that both of the ports 208 and 209 will be closed to the atmosphere. As previously explained, the slide valve 147 will have uncovered the port 145 when high gear was reached, thus equalizing the pressure on opposite sides of the diaphragm 109 to permit the associated spring 118 to move the valve 78 downwardly and thus connect the lower end of the cylinder 62 to the intake manifold. Thus the piston 63 will have been vacuum suspended in its upper or high gear position. The vacuum in the upper end of the cylinder 62 will have been maintained by virtue of the fact that the port 209 was opened to the atmosphere when the knob 177 was placed in high gear position, thus maintaining the diaphragm chamber 107 open to the atmosphere to retain the valve 79 in its upper position.

When the knob 177 has been moved to the neutral position both the ports 208 and 209 will be closed to the atmosphere, thus closing communication between the diaphragm chamber 107 and the atmosphere, whereupon the valve 79 will move upwardly by the exhausting of the air from the chamber 107 through the associated valve passage 85. The port 126 thus will be opened to the atmosphere to admit atmospheric pressure into the upper end of the cylinder 62. Since the slide valve 147 still will be in its forward position uncovering the port 145, atmospheric pressure will remain in the diaphragm chamber 106 to hold the valve 78 in its lower position to maintain a partial vacuum in the lower end of the cylinder 62.

Under such conditions, the admission of atmospheric pressure into the upper end of the cylinder 62 will cause the piston 63 to be moved downwardly to shift the gear set out of high gear position and this movement is accompanied by the transmission of corresponding movement to the slide valve 147. The movement of the shift lever 31, however, will be arrested when neutral position is reached since the slide valve 147 will move rearwardly until it reaches the position shown in Figure 8, whereupon the port 145 will be closed to disconnect the diaphragm chamber 106 from the atmosphere. Air will be exhausted from this chamber through the associated valve passage 85 whereupon the valve 78 will move upwardly to connect the port 125 to the atmosphere and establish atmospheric pressure in the lower end of the cylinder 62. Since atmospheric pressure will have been admitted into the upper end of the cylinder 62 to start the piston 63 in its downward movement, it will be apparent that atmospheric pressure will be present in both ends of the cylinder 62 when neutral position is reached, and thus the gears can remain indefinitely in neutral.

It will be apparent that so long as the gear set remains in neutral position both of the slide valve ports 145 and 146 will be closed to the atmosphere, and so long as the knob 177 remains in the position shown in Figure 4, both of the ports 208 and 209 will be similarly closed to the atmosphere. Thus a partial vacuum will be maintained indefinitely in the chambers 106 and 107 to hold the valves 78 and 79 in their upper positions to connect both ends of the cylinder 62 to the atmosphere. The means for maintaining the gear set in neutral position constitutes one of the most important features of the present invention.

The foregoing description contemplates the operation of the apparatus upon movement of the knob 177 back and forth between second and high gear positions. It will become apparent that the gear set may be placed in low or reverse gear position with equal facility. As previously stated, the gear set is biased toward the second and high gear side by means of the spring 57 which urges the shaft 46 toward the left as viewed in Figure 6. Similarly, the shift knob 177 is biased toward the second and high gear position by means of the spring 169. Assuming that the gears are in neutral position and the operator desires to place the gear set in low gear, he will move the knob 177 toward the left as viewed in Figure 3, thus sliding the shaft 159 in a similar direction. This operation moves the port 166 into registration with the atmospheric port 167, thus connecting the center diaphragm chamber 108 to the atmosphere through the pipe 116. The differential pressure which normally holds the diaphragm 111 in its upper position will thus be destroyed and the associated spring 118 will move the valve 80 downwardly to disconnect the port 127 from the atmosphere and connect it to the vacuum passage 87, as shown in Figure 11. Since the port 127 is connected to the pipe 60, leading to the diaphragm casing 53, it will be apparent that this casing will be connected to the source of partial vacuum, thus establishing a pressure differential on opposite sides of the diaphragm 56. Thus the tension of the spring 57 will be overcome and the diaphragm 56 will move the shaft 46 toward the right as viewed in Figures 2 and 6 to bring the lower end of the shift lever 31 into operative engagement with the shift fork 25. By holding the knob 177 in the position previously described, this knob may be moved rearwardly to place the gear set in low gear position, in which case the motor 61 will operate in exactly the same manner as when the knob 177 was placed in high gear position. Similarly, the knob 177 may be moved forwardly in the slot 172 to place the transmission in reverse gear, the operation of the motor 61 being the same as when the knob 177 is placed in second gear position. In other words, the motor 61 is controlled by forward and rearward movement of the knob 177 in exactly the same manner regardless of whether this knob is being operated at the right or left hand side of the segmental housing 170, the only difference being that when the arm 175 is operating in the slot 173 the lower end of the lever 31 will actuate the shift fork 26 to shift between second and high gear positions, whereas the movement of the arm 175 in the slot 172 causes the motor 61 to transmit movement to the shift fork 25 to shift between first, and reverse gears, the changeover to the shift fork 25 being accomplished by operation of the diaphragm 56 to overcome the biasing spring 57. Since the operation of the motor 61 is identical in either case, its operation need not be repeated in connection with the shifting of the gears between first and reverse gears.

As previously stated, the present apparatus is fully operative for permitting the preselection of gears without awaiting the disengagement of the clutch. The parts of the apparatus whose operation has been described are operative for moving the gear set to any position from any other position provided the clutch has been disengaged, and such parts are operative for permitting preselection provided the knob 177 is moved from an extreme forward position to an extreme rearward position. For example, preselection may take place between second and high gears in the manner described, or it may take place between first and second gears. In the latter case, the knob 177 will be moved from the rear end of the slot 172 to the center thereof, and then laterally through the slot 174 and forwardly to the end of the slot 173. In the latter case, the motor 61 will operate in exactly the same manner as if the knob 177 had been shifted from high to second gear position except that the lower end of the shift lever 31 will cross over from engagement with the shift fork 25 into engagement with the shift fork 26 when neutral position is reached. This, of course, is due to the fact that movement of the knob 177 toward the right as viewed in Figure 3 will have restored the normal position of the shaft 159 to disconnect the ports 166 and 167 and thus reestablish differential pressure in the diaphragm chamber 108 by closing this chamber to the atmosphere and establishing a partial vacuum above the diaphragm 111. This action will cause the valve 80 to move upwardly to connect the port 127 to the atmosphere, thus likewise connecting the diaphragm housing 53 (see Figure 6) to the atmosphere to restore the normal operation of the biasing spring 57.

The parts of the apparatus whose operation has been described will not function in themselves to provide preselection between low and high gears, and for this reason the valve mechanism illustrated in Figures 6 and 7 has been provided. It will become apparent that this valve mechanism is without function when the knob 177 is moved between second and high gears, or when it is moved between first and reverse gears. However, if a driver places the gear set in low gear and then preselects high gear with the idea of eliminating the operation in second gear, or if the driver is temporarily picking up in reverse and intends to start forwardly in second gear and preselects such gear, the valve mechanism referred to functions to permit preselection to take place.

Assuming that the gear set is in low gear position and the operator desires to preselect high gear, he will move the knob 177 from the rear end of the slot 172, through the cross-over slot 171, and then rearwardly in the slot 173. The valve 158 will occupy exactly the same position in the preselected position of the knob 177, and thus it will be apparent that the port 208 will be closed and the port 209 will be opened. Thus the diaphragm chamber 107 will be open to the atmosphere in the manner previously described. At the same time, since the gear set will have been in low gear position, the slide valve 147 will be in its forward position with the port 145 open to the atmosphere. Thus the diaphragm chamber 106 also will be open to the atmosphere, as previously described. Since the vehicle is traveling in low gear, the shaft 46 will be moved to the right of the position shown in Figures 2 and 6 with the shift lever 31 in engagement with the shift fork 25. Referring to Figure 6 it will be noted that the valve 202 is actuated by the rod 206 which, in turn, is controlled by the axial movement of the shaft 46. With this shaft in the position just described, the valve 202 will be moved to the right of its position shown in Figure 7. However, the ports 203 and 204 will remain in registration with their associated ports 197 and 198 since the vacuum in the chamber 53 will have also acted on the valve 196 to move it to its right hand position. The movement of the arm 175 will have closed the atmospheric port 167 however, thus reestablishing vacuum in the chamber 108 to move the valve 80 upwardly. Thus port 127 will open to admit air into the diaphragm chamber 53 and release the valve 196 for movement toward the left. The gear set being in low gear position, however, the valve 202 will not move, hence the ports 203 and 204 will be disconnected from the ports 197 and 198. Thus it will be apparent that the pipes 154 and 195 will be disconnected by movement of the port 204 out of registration with the port 198.

The auxiliary valve referred to, however, does not affect the functioning of the slide valve 147, and as previously stated, this valve will be in the low gear position with the port 145 connected to the atmosphere thus admitting atmospheric pressure into the diaphragm chamber 106. Thus when the accelerator is released, the valve 78 will be in its lower position to afford communication between the vacuum passage 87 and the lower end of the cylinder 62 through the port 125. Since the diaphragm chamber 107 will have been disconnected from the atmosphere by the auxiliary valve shown in Figure 7, differential pressure will exist on opposite sides of the diaphragm 119 to hold the valve 79 in its upper position to connect the upper end of the cylinder 62 to the atmosphere. Thus promptly upon the releasing of the accelerator pedal the piston 63 will move downwardly until neutral position is reached at which point the slide valve 147 will have been moved rearwardly to close the port 145 to the atmosphere and thus establish differential pressure on opposite sides of the diaphragm 109 to move it upwardly and thus cause the valve 78 to disconnect the lower end of the cylinder 62 from the source of partial vacuum. The piston 63 will thereupon promptly stop.

Since the handle 177 will have been moved to the high gear side of the housing 170, the ports 166 and 167 will be disconnected from each other as shown in Figure 3, thus maintaining the center diaphragm chamber 108 disconnected from the atmosphere and maintaining a partial vacuum above the diaphragm 111. Accordingly the valve 80 will be in its upper position uncovering the port 127 to the atmosphere and similarly maintaining the diphragm casing 53 open to the atmosphere. The biasing spring 57 is constantly operating tending to move the shaft 46 toward the left, and when the piston 63 reaches the intermediate position referred to, the spring 57 will promptly shift the shaft 46 toward the left as viewed in Figure 6.

The movement of the shaft 46 transmits movement to the valve 202 to shift it back to the position shown in Figure 7 with the ports 203 and 204 in registration with their respective ports 197 and 198, thus restoring the controlling of the diaphragm 109 and 110 to the slide valve 147 and rotary valve 159. Since the slide valve 147 will have been placed in the neutral position shown in Figure 8 when the piston 63 reached its intermediate position, both the ports 145 and 146 will be closed. However, the knob 177 will be in the high gear position due to the preselection of high gear, and accordingly the port 209 will be open to the atmosphere and will be effective for connecting the diaphragm chamber 107 to the atmosphere since the auxiliary valve ports will have been restored to their normal positions as shown in Figure 7. The shift lever 31 having been moved rearwardly to neutral position and then transversely into engagement with the shift fork 26 by the action of the biasing spring 57, the gear set is ready for movement into high gear. The connection of the diaphragm chamber 107 to the atmosphere permits the associated spring 118 to move the valve 79 downwardly to connect the upper end of the cylinder 62 to the source of partial vacuum through the port 126, and accordingly the upper end of the cylinder 62 will be connected to the source of vacuum and differential pressure will effect upward movement of the piston 63. The arm 68 will then be actuated to rock the shaft 46 in a counterclockwise direction as viewed in Figure 2 to effect the shift into high gear.

Although preselection of low gear while the vehicle is traveling in high gear is seldom resorted to, such operation is possible with the present apparatus in somewhat the same manner as preselection from low to high gear. Assuming that the vehicle is in high gear, the operator may move the knob 177 forwardly, then transversely through the slot 171, and then rearwardly of the slot 172. This operation, when the main valve mechanism is connected to the source of vacuum upon the releasing of the accelerator pedal, results in connecting the diaphragm housing 53, see Figure 6, to the source of partial vacuum in the manner previously described, namely, by axially shifting the shaft 159 to register the ports 166 and 167 to thus exhaust air from the center diaphragm chamber 108 and release the valve 80 for downward movement. The chamber 201 (see Figures 6 and 7) communicates with the interior of the vacuum casing 53, and the vacuum thus established in this casing causes the generation of a differential pressure at the end of the sleeve valve 196 to move this valve to the right as viewed in Figure 7 and thus disconnect the ports 197 and 198 from the respective ports 203 and 204. Thus the auxiliary valve mechanism renders the valve 158 inoperative as in the previously described case.

Since the gear set will be operating in high gear, the port 145 is open to the atmosphere to permit the valve 78 to remain in its lower position while the operation of the auxiliary valve disconnects the diaphragm chamber 107 from the atmosphere, thus permitting differential pressure to hold the valve 79 in its upper position. Thus the upper end of the cylinder 62 will be connected to the atmosphere and the lower end of the cylinder will be connected to the source of vacuum. The piston 63 will thus move to its neutral position at which point the slide valve 147 will close the port 145. Partial vacuum will have been established in the casing 53 in the manner previously stated, and when the neutral position of the piston 63 is reached, the differential pressure existing on opposite sides of the diaphragm 56 will promptly move the latter toward the right, thus sliding the shaft 46 to its low gear position and at the same time sliding the valve 202 to the right to again register the ports 197 and 198 with the ports 203 and 204.

The auxiliary valve thus becomes again inoperative and since the valve 158 will be in its low gear position with the port 209 open to the atmosphere, it will be apparent from the foregoing description that the piston 63 will again move upwardly to place the transmission in low gear. Thus preselection is not limited to the movement of the knob 177 between an extreme forward position and an extreme rearward position, since the auxiliary valve functions under other conditions to permit preselection to take place. The operation of preselecting second gear while the transmission is in reverse is identical with the preselection of high gear when the transmission is operating in low gear, the auxiliary valve functioning to render the valve 158 inoperative until the piston 63 is moved to the intermediate position and the crossover to the second and high gear side has taken place. The preselection of reverse gear when the transmission is in second gear is identical with the preselection of low gear when the transmission is in high gear. The lateral movement of the knob 177 operates to establish differential pressure to move the sleeve valve 196 to the right and thus render the valve 158 inoperative until the neutral position is reached, as previously stated.

From the foregoing it will be apparent that the present invention provides for shifting from any gear position into any other gear position merely by the movement of the knob 177 and any desired preselection may take place. As previously stated, only one pipe is extended to the valve housing 207 to control each end of the cylinder 62, and it similarly will be apparent that only one pipe 116 is necessary for controlling the lateral position of the shift lever 31. In actual practice, the three pipes 116, 194 and 195 may be enclosed within the steering column and are thus completely hidden from view. Only one valve is necessary for controlling the ports 208 and 209 and only one control knob 177 is necessary for operating the valve 158 and for controlling the valve ports 166 and 167.

A further important feature of the apparatus lies in the fact that the entire actuation and controlling of the apparatus takes place without the use of electrical circuits of any kind, and particular attention is invited to the fact that the vehicle may be stopped with the transmission in neutral, thus eliminating the necessity for having to hold the clutch pedal depressed when starting the vehicle. As previously stated, the transmission will remain in neutral position indefinitely when the arm 175 is in engagement with the notch 179.

Particular attention is invited to the function of the screws 78'. As is generally well known, a gear shift lever may be moved as rapidly as desired out of any gear position, but should be retarded somewhat when partaking of its last movement into any gear position, and this is particularly true with modern transmissions employing synchronizing clutches. The valves 78 and 79 are movable upwardly to completely uncover the ports 125 and 126, but the downward movement of the valves is limited by the adjustable screws 78' to only partially uncover the ports 125 and 126. The piston 63 of the actuating motor 61 stops in either of its extreme limits of movement with vacuum present on both sides of the piston and initial movement of the piston is effected by connecting one end of the cylinder 62 to the atmosphere. What may be termed the "storage" of vacuum in the end of the cylinder which is kept closed to the atmosphere provides for relatively rapid initial movement of the piston 63, but continued movement of this piston completely into any gear position depends upon the maintenance of vacuum in the end of the cylinder referred to. The limiting of the opening movement of the ports 125 and 126 restricts communication between the ends of the cylinder 62 and the intake manifold and thus acts to limit the speed with which the piston 63 approaches either limit of movement. More efficient shifting is thus accomplished with a minimum amount of strain and wear on the transmission.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. In combination with a motor vehicle including a clutch and a transmission provided with shifting means, a gear shifting assembly comprising power means operative for moving said shifting means selectively to a plurality of operative positions, control mechanism including a plurality of control devices for rendering said power means operative, fluid pressure means for selectively actuating said control devices, and means operative upon disengagement of the clutch for rendering said control mechanism operative.

2. A gear shifting mechanism for a motor vehicle having a transmission provided with shifting means, comprising power means operative for moving said shifting means selectively to a plurality of operative positions, control mechanism including a plurality of control devices for rendering said power means operative, and fluid pressure means for selectively actuating said control devices.

3. A gear shifting mechanism for a motor vehicle having a transmission provided with shifting means, comprising differential pressure power means for moving said shifting means, control valve mechanism including a plurality of control valves for establishing pressure differentials in said power means for moving said shifting means selectively to a plurality of operative positions, and selectively operable fluid pressure means for actuating said control valves.

4. A gear shifting mechanism for a motor vehicle having a transmission provided with shifting means, comprising power means operative for moving said shifting means selectively to a plurality of operative positions, control mechanism including a plurality of control devices for rendering said power means operative, fluid pressure means for separately actuating said control devices, and remote manual control means for selectively determining the energization of said fluid pressure means.

5. A gear shifting mechanism for a motor vehicle having a transmission provided with shifting means, comprising differential pressure power means for moving said shifting means, control valve mechanism including a plurality of control vavles for establishing pressure differentials in said power means for moving said shifting means selectively to a plurality of operative positions, fluid pressure means for separately actuating said control valves, and remote manual control means for selectively determining the energization of said fluid pressure means.

6. A gear shifting mechanism for a motor vehicle having a transmission provided with shifting means, comprising power means for moving said shifting means, control mechanism for energizing said power means to move said shifting means selectively to a plurality of operative positions, said control mechanism including a plurality of movable control elements, and selectively operable fluid pressure operated actuating means for said control elements.

7. A gear shifting mechanism for a motor vehicle having a transmission provided with shifting means, comprising power means for moving said shifting means, control mechanism for energizing said power means to move said shifting means selectively to a plurality of operative positions, said control mechanism including a plurality of movable control elements, means biasing each of said control elements in one direction, a differential pressure operated device for each control element including a pressure chamber, and means for controlling the pressure in each of said chambers for overcoming said biasing means.

8. A gear shifting mechanism for a motor vehicle having a transmission provided with shifting means, comprising differential pressure power means for moving said shifting means, control valve mechanism for establishing differential pressure in said power means to move said shifting means selectively to a plurality of operative positions, said control valve mechanism including a plurality of control valves, and fluid pressure means independent of said power means for selectively controlling the operation of said valves.

9. A gear shifting mechanism for a motor vehicle having a transmission provided with shifting means, comprising differential pressure power means for moving said shifting means, control valve mechanism for establishing differential pressure in said power means to move said shifting means selectively to a plurality of operative positions, said control valve mechanism including a plurality of control valves each movable to two operative positions, means biasing each of said valves to one of its positions, a fluid pressure device for operating each of said valves including a pressure chamber, and remote control means for changing the pressure in each of said chambers to overcome the biasing means for each valve to move the latter to its other position.

10. A gear shifting mechanism for a motor vehicle having a transmission provided with shifting means, comprising power means operative for moving said shifting means selectively to a plurality of operative positions, control mechanism for said power means, fluid pressure means for actuating said control mechanism, and means subject to manual control and operative in conjunction with said control mechanism for stopping said power means with said shifting means in neutral position, said last named means being connected for movement with said transmission and rendered operative when the latter reaches neutral position.

11. A gear shifting mechanism for a motor vehicle having a transmission provided with shifting means, comprising differential pressure power means for moving said shifting means, control valve mechanism for establishing pressure differentials in said power means for moving said shifting means selectively to a plurality of operative positions, fluid pressure means for actuating said control valve mechanism, and fluid pressure means subject to manual control and operative in conjunction with said control valve mechanism for stopping said power means with said shifting means in neutral position.

12. A gear shifting mechanism for a motor vehicle having a transmission provided with shifting means, comprising power means operative for moving said shifting means selectively to a plurality of operative positions, control mechanism for said power means, fluid pressure means for actuating said control mechanism, remote control means for said fluid pressure means, and means subject to control by said remote control means and operative in conjunction with said control mechanism for stopping said power means with said shifting means in neutral position, said last named means being connected for movement with said transmission and rendered operative when the latter reaches neutral position.

13. A gear shifting mechanism for a motor vehicle having a transmission provided with shifting means, comprising differential pressure power means for moving said shifting means, control valve mechanism for establishing pressure differentials in said power means for moving said shifting means selectively to a plurality of operative positions, fluid pressure means for actuating said control valve mechanism, remote control means for said fluid pressure means, and fluid pressure means subject to control by said remote control means and operative in conjunction with said control valve mechanism for stopping said power means with said shifting means in neutral position.

14. A gear shifting mechanism for a motor vehicle having a transmission provided with shifting means, comprising power means for moving said shifting means, control mechanism for energizing said power means to move said shifting means selectively to a plurality of operative positions, said control mechanism including a plurality of movable control elements, fluid pressure operated actuating means for said control elements, and means subject to manual control and operative in conjunction with said control mechanism for stopping said power device with said shifting means in neutral position, said last named means being connected for movement with said transmission and rendered operative when the latter reaches neutral position.

15. A gear shifting mechanism for a motor vehicle having a transmission provided with shifting means, comprising power means for moving said shifting means, control mechanism for energizing said power means to move said shifting means selectively to a plurality of operative positions, said control mechanism including a plurality of movable control elements, means biasing each of said control elements in one direction, a differential pressure operating device for each control element including a pressure chamber, means for controlling the pressure in each of said chambers for overcoming said biasing means, and fluid pressure means subject to manual control and operative in conjunction with said control mechanism for stopping said power means with said shifting means in neutral position.

16. A gear shifting mechanism for a motor vehicle having a transmission provided with shifting means, comprising power means for moving said shifting means, control mechanism for energizing said power means to move said shifting means selectively to a plurality of operative positions, said control mechanism including a plurality of movable control elements, fluid pressure operated actuating means for said control elements, a transmission controlled valve, and means for rendering said valve operative for actuating said control mechanism for stopping said power means when said shifting means reaches neutral position.

17. A gear shifting mechanism for a motor vehicle having a transmission provided with shifting means, comprising differential pressure power means for moving said shifting means, control valve mechanism for establishing differential pressure in said power means to move said shifting means selectively to a plurality of operative positions, said control valve mechanism including a plurality of control valves, fluid pressure means for operating said control valves, a transmission controlled valve, and means for rendering said last named valve operative for actuating said control valves for stopping said power means when said shifting means reaches neutral position.

18. A gear shifting mechanism for a motor vehicle having an intake manifold and a transmission provided with shifting means, comprising differential pressure power means for moving said shifting means, control valve mechanism for determining the connection of said power means with the atmosphere and the intake manifold to determine the movement of said shifting means selectively into a plurality of operative positions, said control valve mechanism including a pair of valves each movable between two operative positions and biased to one of such positions, a fluid pressure device for operating each valve and including a fluid chamber, said control valve mechanism being provided with a port affording limited communication between each chamber and the intake manifold to tend to establish a pressure differential in each fluid pressure device to move each valve to its other position, and means for opening each chamber to the atmosphere to establish pressure equalization in each fluid pressure device and thus release each valve for movement to its biased position.

19. Apparatus constructed in accordance with claim 18 wherein the means for opening each chamber to the atmosphere comprises a pipe communicating at one end with each chamber, and valve means for selectively opening the other ends of said pipes to the atmosphere.

20. A gear shifting mechanism for a motor vehicle having a transmission provided with shifting means, comprising a differential pressure power device including a member movable by differential pressure on opposite sides thereof and connected to said shifting means, means for effecting a reduction in pressure at one side of movable member to move the latter and thereby move said shifting means to one of its operative positions, means for effecting an identical reduction in pressure at the other side of said movable member when said shifting means reaches such operative position, and means for establishing atmospheric pressure at said first named side of said movable member to move the latter and thereby move said shifting means out of such operative position.

21. A gear shifting mechanism for a motor vehicle having a transmission provided with shifting means, comprising a differential pressure power device including a member movable by differential pressure on opposite sides thereof and connected to said shifting means, means for effecting a reduction in pressure at one side of movable member to move the latter and thereby move said shifting means to one of its operative positions, means for effecting an identical reduction in pressure at the other side of said movable member when said shifting means reaches such operative position, means for establishing atmospheric pressure at said first named side of said movable member to move the latter and thereby move said shifting means to another operative position, and means operative when said shifting means reaches neutral position for establishing atmospheric pressure in said second named side of said movable member to stop the latter and thereby stop said shifting means in neutral position.

22. Apparatus constructed in accordance with claim 21 wherein said last named means comprises a manually operable valve, and a valve operable by said shifting means when the latter reaches neutral position.

23. A gear shifting mechanism for a motor vehicle having a transmission provided with shifting means, comprising a differential pressure power device including a member movable by differential pressure on opposite sides thereof and connected to said shifting means, control valve mechanism for effecting a reduction in pressure at one side of said movable member to move the latter and thereby move said shifting means to one of its operative positions, and a valve operable in accordance with the movement of said shifting means for rendering said valve mechanism operative for effecting an identical reduction in pressure at the other side of said movable member when said shifting means reaches said operative position, said control valve mechanism being operative when said shifting means is in such operative position for establishing atmospheric pressure at said first named side of said movable member to move the latter and thereby move said shifting means to another operative position.

24. Apparatus constructed in accordance with claim 23 provided with means for rendering said valve operative when said shifting means reaches neutral position for establishing atmospheric pressure at said second named side of said movable member to stop the latter and thereby stop said shifting means in neutral position.

25. A gear shifting mechanism for a motor vehicle having an engine provided with an intake manifold and a transmission provided with shifting means, comprising a differential pressure power device including a member movable by differential pressure on opposite sides thereof and connected to said shifting means, a pair of valves each of which is movable to an operative position for connecting one end of said power device to the intake manifold and maintaining such connection, to thereby effect movement of said shifting means to one of its operative positions and retain it in such position, each valve being movable to a second operative position for connecting one end of said power device to the atmosphere, means operative after one valve has been moved to its first named operative position and said shifting means has been moved to one of its operative positions, for moving the other valve to its first named operative position to connect the other side of said power device to the intake manifold, means for moving said first named valve to its second operative position for effecting movement of said shifting means to another operative position, and adjustable means for limiting communication between the intake manifold and the ends of said power device through said valves.

26. Apparatus constructed in accordance with claim 25 provided with adjustable means for limiting communication between the atmosphere and the ends of said power device through said valves.

27. A gear shifting mechanism for a motor vehicle having a transmission provided with shifting means, comprising a differential pressure power device connected to the shifting means, a valve mechanism having a vacuum passage, an atmospheric passage, and a pair of ports respectively communicating with opposite ends of said power device, a pair of valves in said valve mechanism, each movable between a first position connecting said vacuum passage to one of said ports and a second position connecting said atmospheric passage with one of said ports, means biasing each valve to one of its positions, a fluid pressure device for operating each valve including a pair of chambers having a pressure responsive member therein connected to the valve, one chamber of each fluid pressure device being connected to the atmosphere, and manually controlled means for determining the influencing of the other chamber of each fluid pressure device by differential fluid pressure for moving either or both of said valves to their other position.

28. A gear shifting mechanism for a motor vehicle having a transmission provided with shifting means, comprising a differential pressure power device connected to the shifting means, a valve mechanism having a vacuum passage, an atmospheric passage, and a pair of ports respectively communicating with opposite ends of said power device, a pair of valves in said valve mechanism, each movable between a first position connecting said vacuum passage to one of said ports and a second position connecting said atmospheric passage with one of said ports, means biasing each valve to one of its positions, a fluid pressure device for operating each valve including a pair of chambers having a pressure responsive member therein connected to the valve, one chamber of each fluid pressure device being connected to the atmosphere, each valve having a restricted passage communicating between a source of partial vacuum and the other chamber of each fluid pressure device, a pipe connected at one end to each of said other chambers, and a valve means for controlling communication between the atmosphere and the other end of each pipe.

29. A gear shifting mechanism for a motor vehicle having a transmission provided with shifting means, comprising a differential pressure power device connected to the shifting means, a valve mechanism having a vacuum passage, an atmospheric passage, and a pair of ports respectively communicating with opposite ends of said power device, a pair of valves in said valve mechanism each including a stem and a pair of spaced heads carried thereby, each valve having means biasing it to a position affording communication between said vacuum passage and one of said ports, each valve being movable to a second position connecting one of said ports to said atmospheric passage, said vacuum passage being in constant communication with the space between said heads, a fluid pressure device for each valve including a pair of chambers having a pressure responsive member therein connected to the valve, one chamber of each fluid pressure device being connected to the atmosphere, said valve mechanism having a vacuum passage affording restricted communication between each other chamber and a source of partial vacuum, and means for controlling communication between the atmosphere and said other chamber of each fluid pressure device.

30. A gear shifting mechanism for a motor vehicle having a transmission provided with shifting means, comprising a differential pressure power device connected to the shifting means, a valve mechanism having a vacuum passage, an atmospheric passage, and a pair of ports respectively communicating with opposite ends of said power device, a pair of valves in said valve mechanism each including a stem and a pair of spaced heads carried thereby, each valve having means biasing it to a position affording communication between said vacuum passage and one of said ports, each valve being movable to a second position connecting one of said ports to said atmospheric passage, said vacuum passage being in constant communication with the space between said heads, a fluid pressure device for each valve including a pair of chambers having a pressure responsive member therein connected to the valve, one chamber of each fluid pressure device being connected to the atmosphere, said valve mechanism having a vacuum passage communicating at one end with a source of partial vacuum and at the other end with each other chamber, and a removable member arranged in each of said last named vacuum passages and provided with a restricted passage therethrough, and valve means for controlling communication between the atmosphere and said other chamber of each fluid pressure device.

31. In combination with a motor vehicle having an H-type transmission, a gear shifting assembly comprising power means for effecting movement of the transmisison elements from low gear position to high gear position, a plurality of control means for said power means, pneumatic actuating means for each control means, and a manual selector for said pneumatic actuating means.

32. A gear shifting mechanism for a motor vehicle having a transmission provided with shifting means, comprising a power device having movable means connected to said shifting means, a pair of control devices each normally biased to an operative position tending to actuate said movable means to move said shifting means to one operative position, and means for overcoming the normal bias of either of said control devices to move it to a second position releasing said movable means.

33. A gear shifting mechanism for a motor vehicle having a transmission provided with shifting means, comprising a differential pressure power device having a pressure movable member therein connected to said shifting means, a pair of valves each normally biased to an operative position connecting one end of said power device to a source of differential pressure, and means for overcoming the normal bias of either of said valves to move it to a second position connecting one end of said power device to the atmosphere.

34. A gear shifting mechanism for a motor vehicle having a transmission provided with shifting means, comprising a differential pressure power device having a pressure movable member therein connected to said shifting means, a pair of valves each normally biased to an operative position connecting one end of said power device to a source of differential pressure, means for overcoming the normal bias of either of said valves to move it to a second position connecting one end of said power device to the atmosphere, to actuate said movable member and move said shifting means to one position, and means operative when said shifting means reaches such position for releasing said last named valve.

35. A gear shifting mechanism for a motor vehicle having a transmission provided with shifting means, comprising a differential pressure power device having a pressure movable member therein connected to said shifting means, a pair of valves each normally biased to an operative position connecting one end of said power device to a source of differential pressure, means for overcoming the normal bias of either of said valves to move it to a second position connecting one end of said power device to the atmosphere to actuate said movable member and move said shifting means to one position, and a valve movable in accordance with the transmission of movement to said shifting means and operative when the latter reaches said position for releasing said last named valve.

36. A gear shifting mechanism for a motor vehicle having a transmission provided with shifting means, comprising a differential pressure power device having a pressure movable member therein connected to said shifting means, a pair of valves each normally biased to an operative position connecting one end of said power device to a source of differential pressure, control means operative for overcoming the normal bias of both of said valves to hold them in a second position connecting both ends of said power device to the atmosphere when said shifting means is in neutral position, said control means being operable for releasing one of said valves to its biased position to move said shifting means to one position, and means automatically operative when said shifting means reaches such position for releasing the other valve.

37. A gear shifting mechanism for a motor vehicle having a transmission provided with shifting means, comprising a differential pressure power device for moving said shifting means, control valve mechanism for said power device including a plurality of control valves each movable to two positions, means biasing each valve to one of its positions connecting one end of said power device to a source of differential pressure, a fluid pressure device for moving each of said valves to a second position connecting one end to the power device to the atmosphere, each fluid pressure device including a chamber, said valve mechanism having a restricted passage connecting each chamber to a source of differential pressure to tend to overcome said biasing means, a pipe connected at one end to each chamber, and a manually operable valve for selectively connecting said chambers to the atmosphere.

38. A gear shifting mechanism for a motor vehicle having a transmission provided with shifting means, comprising a differential pressure power device for moving said shifting means, control valve mechanism for said power device including a plurality of control valves each movable to two positions, means biasing each valve to one of its positions connecting one end of said power device to a source of differential pressure, a fluid pressure device for moving each of said valves to a second position connecting one end of the power device to the atmosphere, each fluid pressure device including a chamber, said valve mechanism having a restricted passage connecting each chamber to a source of differential pressure to tend to overcome said biasing means, a pipe connected at one end to each chamber, a manually operable valve for selectively connecting said chambers to the atmosphere, and automatic valve means operable in accordance with the movement of said shifting means for connecting one of said pipes to the atmosphere after the other of said pipes has been connected to the atmosphere by the movement of said manually operable valve and said shifting means has reached one of its positions.

39. A gear shifting mechanism for a motor vehicle having a transmission provided with shifting means, comprising power means connected to said shifting means, a plurality of control devices for said power means, each movable to two operative positions, means biasing each control device to one of its operative positions, and means for selectively overcoming the biasing means of either control device to move it to its other position.

40. A gear shifting mechanism for a motor vehicle having a transmission provided with shifting means, comprising power means connected to said shifting means, a plurality of control devices for said power means, means biasing each control device to one position, a fluid pressure operated device for moving each control device to a second operative position against said biasing means, each fluid pressure device including a pressure chamber, a conduit affording restricted communication between each chamber and a source of differential pressure, and means for controlling communication between said chambers and the atmosphere.

41. A gear shifting mechanism for a motor vehicle having a transmission provided with shifting means, comprising power means connected to said shifting means, a plurality of control devices for said power means, means biasing each control device to one position, a fluid pressure operated device for moving each control device to a second operative position against said biasing means, each fluid pressure device including a pressure chamber, a conduit affording restricted communication between each chamber and a source of differential pressure, and a valve for selectively opening said chambers to the atmosphere.

42. A gear shifting mechanism for a motor vehicle having a transmission provided with shifting means, comprising power means connected to said shifting means, a plurality of control devices for said power means, means biasing each control device to one position, a fluid pressure operated device for moving each control device to a second operative position against said biasing means, each fluid pressure device including a pressure chamber, a conduit affording restricted communication between each chamber and a source of differential pressure, a valve for selectively opening said chambers to the atmosphere, and means movable with the gear shift when the latter reaches a gear position for opening to the atmosphere one of said chambers which has been previously closed to the atmosphere by said valve.

EDWARD G. HILL.
HENRY W. HEY.

DISCLAIMER 2,030,838.—*Edward G. Hill* and *Henry W. Hey*, Richmond, Va. GEAR SHIFTING MECHANISM FOR MOTOR VEHICLES. Patent dated February 11, 1936. Disclaimer filed March 17, 1939, by the assignee, *Automatic Shifters, Inc.*

Hereby enters this disclaimer to claims 1, 2, 3, 4, 5, 6, 8, and 39 in said specification.

[*Official Gazette April 18, 1939.*]